United States Patent [19]
Aoki et al.

[11] Patent Number: 5,344,595

[45] Date of Patent: Sep. 6, 1994

[54] METHOD OF PRODUCING A CUSHION FROM WASTE PAPER OR PULP

[75] Inventors: Shinji Aoki, Osaka; Shigeru Miyawaki, Hyogo; Koichi Yoshida, Hyogo; Seiichi Yonekawa, Hyogo, all of Japan

[73] Assignee: Settsu Corporation, Hyogo, Japan

[21] Appl. No.: 31,505

[22] Filed: Mar. 15, 1993

[30] Foreign Application Priority Data

Mar. 13, 1992 [JP] Japan .................. 4-090024
Jun. 23, 1992 [JP] Japan .................. 4-189827

[51] Int. Cl.$^5$ .................. B29C 43/00; B32B 31/00
[52] U.S. Cl. .................. 264/26; 264/37; 264/45.4; 264/102; 264/DIG. 69; 156/60
[58] Field of Search .................. 264/DIG. 69, 37, 126, 264/109, 112, 113, 25, 26, 45.4, 102; 156/214, 60

[56] References Cited

U.S. PATENT DOCUMENTS

| | | | |
|---|---|---|---|
| 4,102,963 | 7/1978 | Wood | 264/518 |
| 4,123,489 | 10/1978 | Kelley | 264/DIG. 69 |
| 4,242,220 | 12/1980 | Sato | 264/109 |
| 4,772,430 | 9/1988 | Sauda et al. | 264/25 |
| 4,810,445 | 3/1989 | Lamb, Sr. et al. | 264/DIG. 69 |
| 4,894,192 | 1/1990 | Warych | 264/DIG. 69 |

FOREIGN PATENT DOCUMENTS

| | | | |
|---|---|---|---|
| 0203789 | 12/1986 | European Pat. Off. | 264/109 |
| 52-025468 | 7/1977 | Japan | 264/126 |
| 55-086736 | 6/1980 | Japan | 264/126 |
| 55-103934 | 8/1980 | Japan | 264/DIG. 69 |
| 61-89005 | 5/1986 | Japan . | |
| 1675087 | 9/1991 | U.S.S.R. | 264/126 |

Primary Examiner—Allan R. Kuhns
Attorney, Agent, or Firm—Wenderoth, Lind & Ponack

[57] ABSTRACT

This invention provides a paper molded cushion having a sufficient shock absorbing ability without substantial deformation during the drying process even if the shape of the cushion is very complex. The process comprises the steps of mechanically fluffing waste paper or pulp, adding a proper amount of adhesive to the fluffed paper of pulp, mixing uniformly, casting the mixture in a mold having water drainage small apertures thereof, heating said mold with the mixture therein by dielectric heating or microwave heating, thereby drying the molded paper cushion to a predetermined water content level and taking out the molded paper cushion from the mold. It is also possible to heat and dry the molded paper product under reduced pressure conditions for accelerating the water evaporation or to add a small amount of foamable synthetic plastic particles with the adhesive for making voids inside the molded paper cushion; consequently, the weight of the paper cushion is effectively reduced and the shock absorbing ability is increased. Further if the shape of the product is complex, the mold is divided into plurality of cross-sectional layer parts corresponding to the cross-section of the desired shape and the molded paper parts are assembled with adhesives to form the final shape of the paper cushion.

5 Claims, 4 Drawing Sheets

METHOD OF PRODUCING A CUSHION FROM WASTE PAPER OR PULP

BACKGROUND OF THE INVENTION

1. Field of the Invention

The present invention relates to a method of producing a cushion from waste paper or pulp, more specifically, to a method of producing a cushion with high precision from fluffed waste paper or pulp without deformation while being subjected to a drying process.

2. Prior Art

Machines, electric apparatus and other products(-hereinafter referred to as products) are usually packed to avoid damages during transporting and storing. Especially, the electric apparatuses are packed in paper board boxes and further inside the boxes they are covered with foamed styrol cushions which conform with the shape of the products to protect the products from damages caused by shock. The foamed styrol cushion is very light in weight, cheap in cost and its shock absorbing ability is sufficient. Moreover it is easy to form any desired shape which conform with the shape of the products. The cushions are usually disposed after usage by burying or incinerating but the volume of the foamed styrol cushion is comparatively large and as the foamed styrol is kind of a synthetic plastic, it is not automatically decomposed in the nature, which is considered to be an environmental pollution. On the other hand when the foamed styrol cushion is subjected to incineration, it generates a high calorific heat which causes undesirable damages to an incineration furnace.

To cope with the above mentioned problems, a use of recyclable waste paper as a cushion is recently developed. Used paper is fluffed, dispersed in the water, formed into a desired shape by pressing and dehydrating and further dried with or without heating. But the pulp molded cushion produced according to the above described method is highly dense and hard, subsequently the shock absorbing ability is limited to a certain extent and sometime the products may be damaged by a shock. It is also difficult to form a desired shape with high precision since the molded paper cushion deforms while being heated for drying.

BRIEF DESCRIPTION OF THE INVENTION

The objective of this invention is to provide a paper molded paper cushion having a sufficient shock absorbing ability without substantial deformation even if the shape of the paper cushion is very complex.

The first method of the invention comprises the steps of mechanically fluffing waste paper or pulp, adding an adhesive to the fluffed paper or pulp, mixing the mixture until they are uniformly mixed, casting said mixture in a mold, heating said mold by dielectric heating or micro wave heating until the molded paper cushion reaches the predetermined water content and taking out the paper cushion from the mold.

The second method of the invention comprises the steps of mechanically fluffing waste paper or pulp, adding an adhesive to the fluffed paper or pulp, mixing the mixture until they are uniformly mixed, casting said mixture in a mold, heating said mold by dielectric heating or micro wave heating under reduced pressure condition until the molded paper cushion reaches the predetermined water content and taking out the paper cushion from the mold.

The third method of the invention comprises the steps of mechanically fluffing waste paper or pulp, adding an adhesive and a small amount of foamable synthetic plastic particles to the fluffed paper or pulp, mixing the mixture until they are uniformly mixed, casting said mixture in a mold, heating said mold by dielectric heating or micro wave heating until the molded paper cushion reaches the predetermined water content and taking out the paper cushion from the mold.

And the fourth method of the invention comprises the steps of mechanically fluffing waste paper or pulp, adding an adhesive to the fluffed paper or pulp, mixing the mixture until they are uniformly mixed, casting said mixture in molds which consists the layered parts of the final shape of the cushion utilizing auxiliary molds, sucking the air from the bottom of the molds until a predetermined compression ratio is obtained, heating said molds by dielectric heating or micro wave heating until the molded paper cushion reaches the predetermined water content, taking out the molded layered parts from the molds and assembling the parts together to form the final shape of the paper cushion.

According the methods of this invention, we can expect the following advantages.

One can obtain a nature friendly and disposable paper cushion. Even if the paper cushion is very thick, a distortion of the molded paper cushion is substantially negligible because the mold is heated by dielectric heating or micro wave heating and it is dried uniformly. Consequently the paper cushion is manufactured with high precision.

The paper cushion according to the invention has a high shock absorbing ability.

Further, according to the second method of the invention, because the drying process is conducted under the condition of reduced pressure, a period of drying process becomes very short as the boiling point of the water is lowered and the water contained in the paper cushion evaporates very rapidly compared with the normal pressure condition.

According to the third method of the invention, because of the foamable synthetic plastic particles, the weight of the paper cushion is reduced and the paper cushion exhibits a high shock absorbing ability.

According to the fourth method of the invention, as the cushion is divided into several layered parts, it is possible to form a very thick or very complex shape paper cushion without substantial distortion thereof.

DETAILED DESCRIPTION OF THE INVENTION

Figure 1:
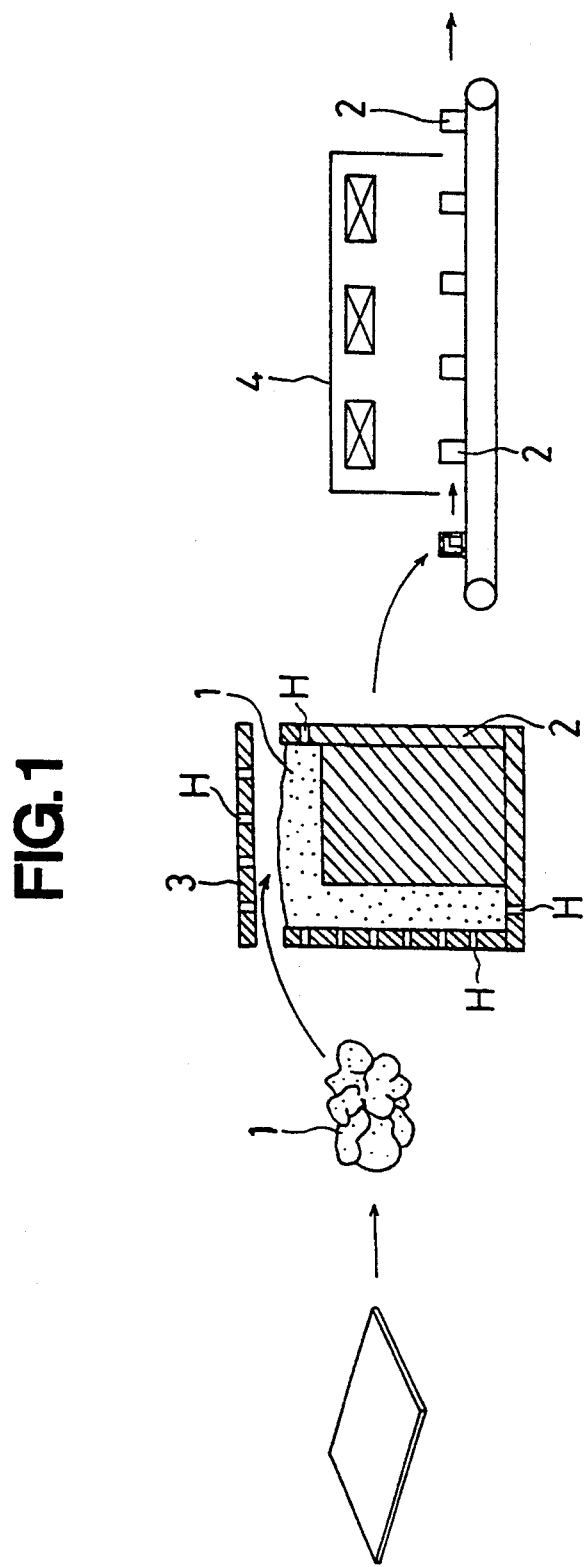
FIG. 1 is a schematic diagram indicating a process of producing a paper cushion.
Figure 2:
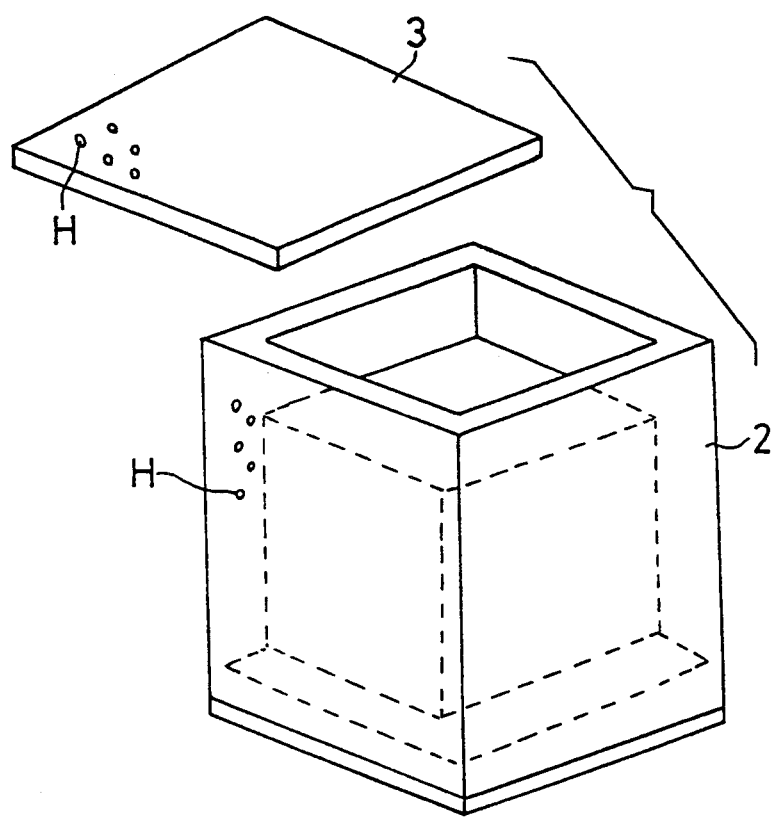
FIG. 2 is a transverse view of an example of a mold for paper cushion.
Figure 3:
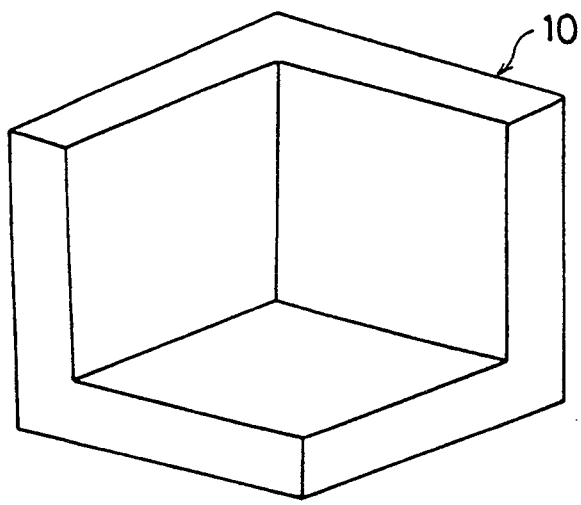
FIG. 3 is a transverse view of a molded paper cushion.

The invention of this application will be further explained with reference to the attached drawings.

First, waste paper board or the like is mechanically fluffed or ground by a fluffer, a mill or a refiner to obtain fluff pulp. The fluff pulp is fluffy, flexible and very soft. A certain amount of predetermined concentration of an adhesive, such as starch or vinyl acetate, is added to the fluff pulp, and mixed until the mixture becomes uniform, which is a paper cushion material 1.

The paper cushion material 1 is then cast in a mold 2, which is made of heat durable and non-melt plastic, because the mold filled with paper cushion material is heated afterwards for drying the molded paper cushion therein. The fluff pulp is cast in a mold and there are provided voids between the fluff pulp fiber which exhibit shock absorbing ability.

The opening of the mold is covered with a cover 3 made of the same material of the mold. Small size apertures H, which will not permit the fluff pulp flow out therethrough, are disposed side of the mold to allow the water evaporating therethrough. The apertures are also disposed at the cover 3 if necessary. The mold filled with fluff pulp material is now introduced to a dryer 4 for drying process.

Dielectric heating or micro wave heating are preferable method for drying the molded paper cushion without giving any undesirable deformation to the mold itself and the molded paper products. The fluff pulp material is heated inside the dryer 4, then the water molecules are vibrated by the micro wave which produces a heat, subsequently the water evaporates and becomes gaseous state which will be released from the apertures thereof.

Heating time is determined depending on an amount of the paper material filled in the mold, a water content, and a quality of the paper material. If the pressure inside the dryer is lowered, then the boiling point of the water becomes low, consequently the water evaporation rate is accelerated, and heating time will be decreased.

It is also possible to add a small amount of heat foamable micro sphere plastic particles with the adhesives. The heat foamable micro sphere plastic particle comprises a shell polymer consisting of a vinylidene chloride or an acrylo nitrile copolymer and a sealed heat foamable content inside the shell, such as an isobutane. When the micro sphere particles are heated, the outer shells are softened and the inner foamable content foames so that the micro sphere particles inflate like a baloon as a real sphere and there exist voids inside the molded paper cushion. Therefore the weight of the molded paper product containing foamable micro sphere particles is reduced and a shock absorbing ability is improved.

After the mold is dried, molded paper product is taken out from the mold which will be used as a cushion 10.

Figure 4:
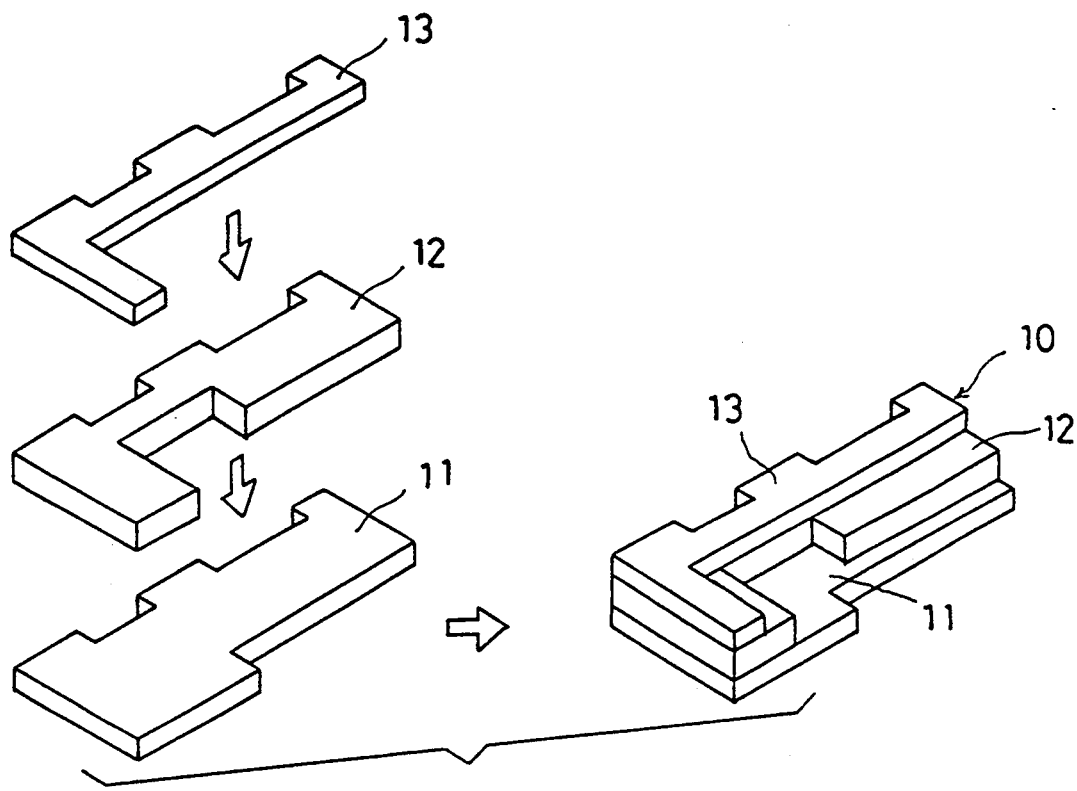
FIG. 4 is a transverse view of a cushion consisting of several parts.
Figure 5:
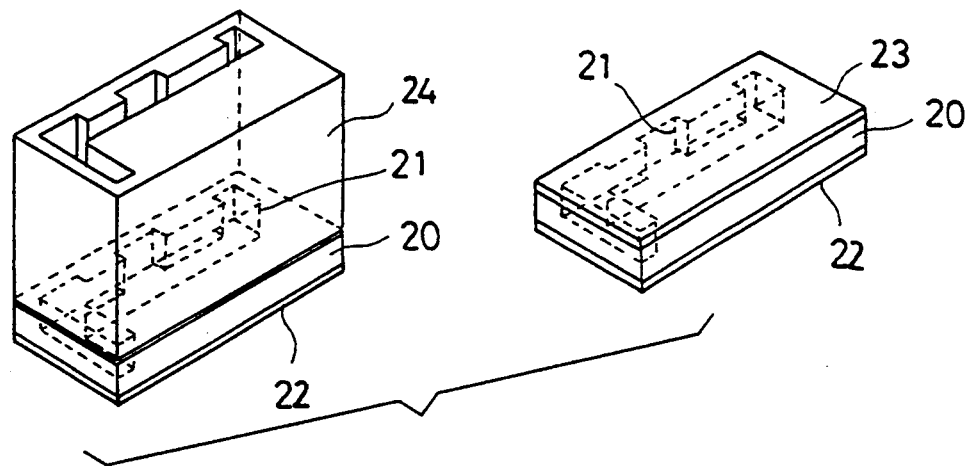
FIG. 5 is a schematic diagram of explaining a casting process of a mold part with auxiliary mold.
Figure 6:
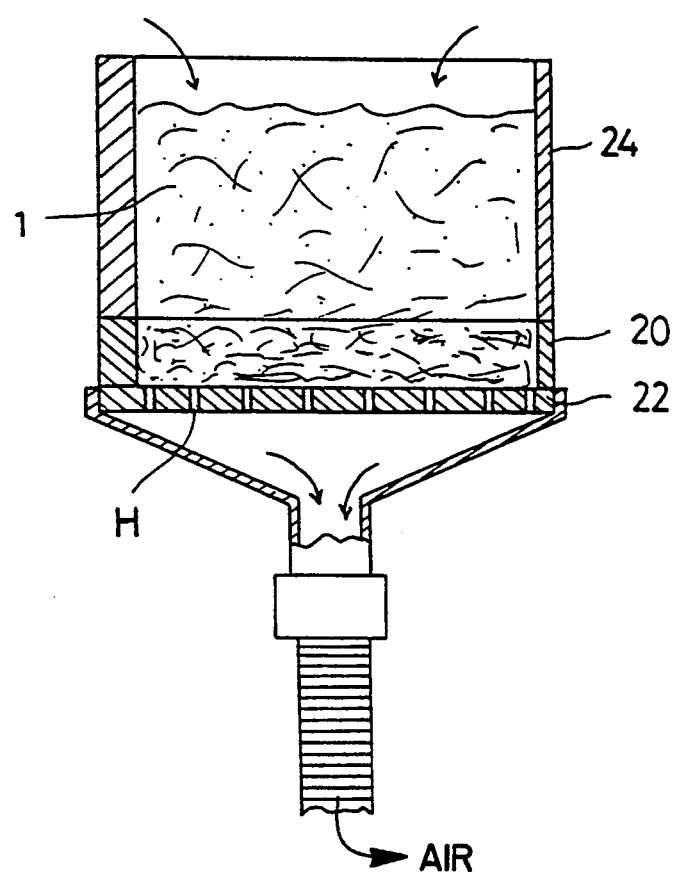
FIG. 6 is a sectional view indicating a casting process utilizing air suction.

The above described embodiment is a cushion made by one shot process but in ease a shape of the cushion is very complex, the final shape is divided into several layered parts so that a shape of the each divided mold will be simpler. As indicated in FIG. 4, the cushion is divided into three parts and the each part is assembled to form a final shape of the cushion. It is preferable to form component parts as a simple plane member so that the fluff pulp material is filled in the mold uniformly.

A bottom plate 22 disposed at the bottom of the each mold 20 has a lot of small apertures through which the air is sucked causing the air flow from top to bottom so that filled fluff pulp material is uniformly layered in the mold very rapidly. An auxiliary mold 24 is detachably placed upon the mold 20. The inner section of the auxiliary mold 24 is identical with that of the mold 20 and the inner volume of the auxiliary mold is determined depending on a compression ratio of the fluff pulp material. The auxiliary mold and the mold can contain a sufficient amount of the fluff pulp material which will be pressed to form the desired shape.

The molds 2 which are also made of heat resistant and non-melt plastic, because the molds are heated for drying the molded paper product therein. The fluff pulp fibers cling each other in the mold so that there are produced voids therebetween which ensure shock absorbing capability. Cushion material filled in the auxiliary mold and the mold is then compressed to form the resulted product and the auxiliary mold is detached from the mold. A cover made of the same material of the mold is placed on the mold opening and the cushion material is now compressed. The water contained in the cushion material evaporates and scatters away through the apertures disposed at the mold walls. There is disposed apertures on the cover if necessary.

The cushion mold is then sent to a drying process which is the same process as described above. After drying process, the each paper cushion part 11,12,13 are assembled by adhesives to form a final paper cushion 10.

What we claim is:

1. A method of producing a cushion from waste paper or pulp comprising the steps of mechanically fluffing waste paper or pulp, adding an adhesive amount of an adhesive to the fluffed paper or pulp to form a mixture and mixing uniformly, casting said mixture in a mold having water drainage small apertures therein, closing an opening of the mold by placing, over said opening, a cover having drainage small apertures therein, heating said mold with the mixture therein by dielectric heating or microwave heating, thereby drying the molded paper cushion to a predetermined water content level, and removing the molded paper cushion from the mold, said apertures in the mold and cover being of sufficient size to permit water to evaporate therethrough, but which do not permit the fluffed paper or pulp to flow through the apertures.

2. A method of producing a cushion from waste paper or pulp comprising the steps of mechanically fluffing waste paper or pulp, adding an adhesive amount of an adhesive to the fluffed paper or pulp to form a mixture and mixing uniformly, casting said mixture in a mold having water drainage small apertures therein, closing an opening of the mold by placing over said opening, a cover having water drainage small apertures therein, heating said mold with the mixture therein by dielectric heating or microwave heating under reduced pressure conditions, thereby drying the molded paper cushion to a predetermined water content level, and removing the paper cushion from the mold, said apertures in the mold and cover being of sufficient size to permit water to evaporate therethrough, but which do not permit the fluffed paper or pulp to flow through the apertures.

3. A method of producing a cushion from waste paper or pulp comprising the steps of mechanically fluffing waste paper or pulp, adding an adhesive amount of an adhesive and a small amount of foamable synthetic plastic particles to the fluffed paper or pulp to form a mixture and mixing uniformly, casting said mixture in a mold having water drainage small apertures therein, closing an opening of the mold by placing, over said opening, a cover having water drainage small apertures therein, heating said mold with the mixture therein by dielectric heating or microwave heating, thereby drying the molded paper cushion to a predetermined water content level, and removing the paper cushion from the mold, said apertures in the mold and cover being of sufficient size to permit water to evaporate therethrough, but which do not permit the fluffed paper or pulp to flow through the apertures.

4. A method of producing a cushion from waste paper or pulp comprising the steps of mechanically fluffing waste paper or pulp, adding an adhesive amount of an adhesive to the fluffed paper or pulp to form a mixture and mixing uniformly, casting said mixture in a mold having water-drainage small apertures therein, while evacuating air from the bottom of the mold to obtain a predetermined compression ratio of the mixture, closing an opening of the mold by placing, over said opening, a cover having water drainage small apertures therein, heating said mold by dielectric heating or microwave heating, thereby drying the mixture to a predetermined water content level and removing the molded paper cushion from the mold, said apertures in the mold and cover being of sufficient size to permit water to evaporate therethrough, but which do not permit the fluffed paper or pulp to flow through the apertures.

5. A method of producing a cushion from waste paper or pulp comprising the steps of mechanically fluffing waste paper or pulp, adding an adhesive amount of an adhesive to the fluffed paper or pulp to form a mixture and mixing uniformly, casting said mixture with guide members in different molds having water drainage small apertures therein, each of said molds being a cross-sectional layer of the desired shape of the cushion, evacuating air from the bottom of the molds to obtain a predetermined compression ratio of the mixture, heating the molds with the mixture therein by dielectric heating or microwave heating, thereby drying the molded paper cushion layer parts to a predetermined water content level, removing the molded cushion parts from the molds and assembling the layer parts together with an adhesive to form the desired shape of that paper cushion, said apertures in the molds being of sufficient size to permit water to evaporate therethrough, but which do not permit the fluffed paper or pulp to flow through the apertures.

* * * * *